US008341906B2

(12) United States Patent
Murata

(10) Patent No.: US 8,341,906 B2
(45) Date of Patent: Jan. 1, 2013

(54) MONOPOLE TOWER AND WIND TURBINE GENERATOR HAVING MONOPOLE TOWER

(75) Inventor: Hajime Murata, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 255 days.

(21) Appl. No.: 12/674,565

(22) PCT Filed: Dec. 25, 2009

(86) PCT No.: PCT/JP2009/071577
§ 371 (c)(1),
(2), (4) Date: Feb. 22, 2010

(87) PCT Pub. No.: WO2011/077546
PCT Pub. Date: Jun. 30, 2011

(65) Prior Publication Data
US 2011/0278850 A1  Nov. 17, 2011

(51) Int. Cl.
*E02D 27/32* (2006.01)
*E02D 27/42* (2006.01)
*E04C 3/00* (2006.01)
(52) U.S. Cl. ................. 52/297; 52/170; 52/834
(58) Field of Classification Search .............. 52/40, 170, 52/651.01, 651.05, 651.07, 831, 834, 835, 52/845, 848, 849, 854, 292, 294, 295, 296, 52/297
See application file for complete search history.

(56) References Cited

U.S. PATENT DOCUMENTS

| | | | | |
|---|---|---|---|---|
| 5,826,387 A | * | 10/1998 | Henderson et al. | 52/295 |
| 7,614,200 B2 | * | 11/2009 | Wobben | 52/741.14 |
| 7,877,944 B2 | * | 2/2011 | Seidel | 52/296 |
| 7,900,406 B2 | | 3/2011 | Wobben | |
| 2005/0072067 A1 | | 4/2005 | Wobben | |
| 2007/0251187 A1 | * | 11/2007 | Schiffer et al. | 52/741.14 |
| 2009/0235597 A1 | | 9/2009 | Wobben | |

FOREIGN PATENT DOCUMENTS

| | | |
|---|---|---|
| JP | 62-228571 A | 10/1987 |
| JP | 62-177854 U | 11/1987 |
| JP | 6-173226 A | 6/1994 |
| JP | 7-207833 A | 8/1995 |
| JP | 8-004125 A | 1/1996 |
| JP | 2000-257175 A | 9/2000 |
| JP | 2005-515321 A | 5/2005 |

(Continued)

OTHER PUBLICATIONS

International Search Report (PCT/ISA/210) mailing date of Jan. 26, 2011 in corresponding International application No. PCT/JP2009/071577.

(Continued)

*Primary Examiner* — Jessica Laux
(74) *Attorney, Agent, or Firm* — Westerman, Hattori, Daniels & Adrian, LLP

(57) ABSTRACT

The present invention provides a monopole tower having a tower supporting structure in which the outer dimension of a tower shell is the maximum dimension by eliminating a base plate which extends toward the outside of the tower shell. In a monopole tower provided upright on a foundation B, a lower end side of the tower 2 comprised a tower-side coupling member in a range equal to or less than outside diameter of a tower shell 21. In a space comprising a foundation-side coupling member provided on the foundation B, the foundation-side coupling member and the tower-side coupling member are coupled by welding, a bolt using a splice plate, or a rivet.

7 Claims, 14 Drawing Sheets

FOREIGN PATENT DOCUMENTS

| | | |
|---|---|---|
| JP | 2005-171705 A | 6/2005 |
| WO | 2003/031733 A1 | 4/2003 |

OTHER PUBLICATIONS

Japanese Office Action dated May 1, 2012, issued in corresponding Japanese Patent Application No. 2010-507159, (6 pages). w/ English Translation.

Korean Office Action dated Sep. 26, 2012, issued in corresponding Korean patent application No. 10-2010-7006672.

A Decision to Patent Grant dated Nov. 6, 2012, issued in corresponding Japanese Patent Application No. 2010-507159 (3 pages).

* cited by examiner

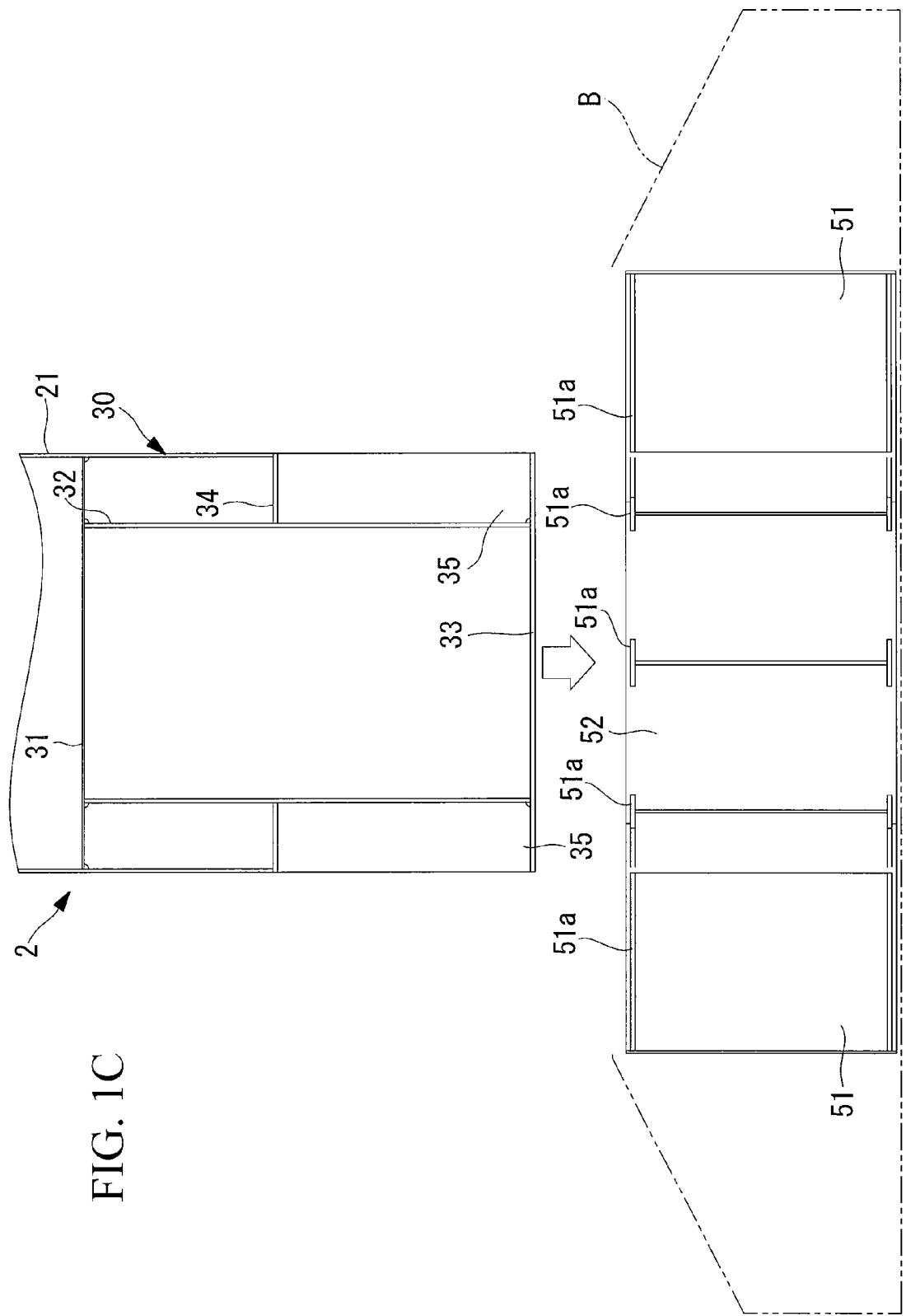

MONOPOLE TOWER AND WIND TURBINE GENERATOR HAVING MONOPOLE TOWER

TECHNICAL FIELD

The present invention relates to a monopole tower and a wind turbine generator having a monopole tower (support).

BACKGROUND ART

In a wind turbine generator, a rotor head having wind turbine blades receives wind force and rotates, the rotation is increased by a speed-up gear, and power is generated by a power generator which is driven by the increased rotation.

The rotor head is mounted on a tower for a wind turbine (hereinbelow, called "tower"), attached to an end of a nacelle which can yaw, and supported so as to be rotatable about the rotary axis in an substantially horizontal direction.

Generally, the tower for a wind turbine often employs a monopole type made of steel using a cylindrical shell, and has a structure that a base plate provided at the lower end of the tower shell is fixed to a foundation made of reinforced concrete by an anchor bolt.

FIGS. 11 and 12 show a conventional tower supporting structure. At the lower end of a tower 2, a flange-shaped base plate 22 projected in the horizontal direction from both inner and outer faces of a tower shell 21 is provided. The base plate 22 is a member for coupling and fixing the tower 2 to a foundation B via a number of anchor bolts 10 whose lower ends are embedded in the foundation B. In the configuration example shown in the diagram, two lines of anchor bolts 10 are disposed on a concentric circle on the outer peripheral side and the inner peripheral side of the cylindrical-shaped tower shell 21. By screwing a nut 11 on the upper end side of each of the anchor bolts 10 penetrating bolt holes 22a in the base plate 22, fixing is performed. Reference numeral 12 denotes a layer of grout formed on the concrete of the foundation B.

In a joint structure of a steel column and a steel joist, a method of easily obtaining a clearance with a fixing bracket by slightly moving the joist without requiring subtle crane operation, auxiliary heavy machine, and the like for adjustment is proposed. In the joint structure, both of the fixing bracket for the steel column and the steel joist are cut in a form that they are open to a plumbing side, and a splice plate is attached and fastened with a high-strength bolt, thereby constructing the joint (refer to, for example, patent citation 1).
Patent Citation 1: Japanese Unexamined Patent Application, Publication No. Hei 7-207833

The conventional tower supporting structure has a higher effect by disposing the anchor bolt 10 on the outside of the tower shell 21, so that the base flange often extends toward the outside of the tower shell 21. Further, since the shell member made of steel and having the cylindrical shape is a main strength member, the larger the outside diameter of the tower shell 21 is, the higher a section efficiency is. The monopole tower made of steel is therefore demanded to increase the outside diameter of the shell as much as possible within the range in which the weight can be reduced.

On the other hand, external dimensions of the tower 2 have to satisfy constraint conditions at the time of transportation and the like. In the case of the monopole, the tower 2 is divided into a plurality of sections in the height direction, and the sections are transported. A tower section of a base portion is transported in a state where the base plate 22 is welded and integrated with the tower shell 21. Consequently, the outside diameter of the base plate 22 extended toward the outside of the tower shell 21 becomes the maximum outside diameter of the tower 2. Consequently, it is difficult to increase the outside diameter of the tower shell 21 to the constraint condition.

DISCLOSURE OF INVENTION

The present invention has been achieved in view of the above circumstances and an object of the invention is to provide a wind turbine power generator having a tower supporting structure in which the outside diameter of the tower shell becomes the maximum diameter by eliminating the base plate extended toward the outside of the tower shell.

In order to solve above mentioned problems, following means are adopted.

In accordance with one aspect of the present invention, there is provided a monopole tower provided upright on a foundation, wherein a lower end of the tower has a tower-side coupling member in a range of an outside diameter of a tower shell or less and, in a space having a foundation-side coupling member provided for the foundation, the foundation-side coupling member and the tower-side coupling member are coupled to each other by welding, a bolt using a splice plate, or a rivet.

In the monopole tower provided as the above aspect of the invention, the lower end of the tower has the tower-side coupling member in the range of the outside diameter of the tower shell or less and, in the space having the foundation-side coupling member provided for the foundation, the foundation-side coupling member and the tower-side coupling member are coupled to each other by welding, the bolt using the splice plate, or the rivet. Therefore, there is no member such as a base plate larger than the outside diameter of the tower shell, and as a result, the outside diameter of the tower shell can be increased to the constraint condition, and the section efficiency can be improved. That is, as the maximum outside diameter of the tower, the outside diameter of the tower shell can be used.

In the above aspect, the lower end side of the tower may have a double-pipe structure made by a tower shell and an inner cylinder, and the inner cylinder extended toward the inside of the foundation and the tower-side coupling member may be inserted in the space.

In accordance with another aspect of the present invention, there is provided a monopole tower provided upright on a foundation made of reinforced concrete, wherein a foundation coupling part is formed on a lower end side of the tower, the foundation coupling part comprising: a diaphragm mounted vicinity of a lower end on the inside of the tower; an inner cylinder coupled to the under face of the diaphragm and extending downward in a tower shell to the inside of the foundation; a bottom plate attached to the lower end of the inner cylinder and having a diameter substantially the same as the outside diameter of the tower shell; tower-side brackets coupled to the inner face of the tower shell, the under face of the diaphragm, an outer face of the inner cylinder, and a top face of the bottom plate and disposed radially from the outer peripheral face of the inner cylinder in a range of an outside diameter of the tower shell or less; and a ring diaphragm coupling the lower end of the tower shell, the outer peripheral face of the inner cylinder, and the tower-side brackets, a tower coupling space is formed in a center portion of the foundation, the tower coupling space comprising: a foundation space to which the foundation coupling part is inserted, and a foundation-side bracket disposed on an extension line of the tower-side bracket so as to be coupled and fixed to the tower-side bracket, and exposed to the foundation space is formed, the foundation coupling part is inserted in the tower coupling space, and between the coupling members on the foundation coupling part side and the foundation-side brackets are coupled via a splice plate or welding.

In the monopole tower provided as another aspect of the invention, a foundation coupling part is formed on a lower end side of the tower. The foundation coupling part comprises: a diaphragm mounted vicinity of a lower end on the inside of the tower; an inner cylinder coupled to the under face of the diaphragm and extending downward in a tower shell to the inside of the foundation; a bottom plate attached to the lower end of the inner cylinder and having a diameter substantially the same as the outside diameter of the tower shell; tower-side brackets coupled to the inner face of the tower shell, the under face of the diaphragm, an outer face of the inner cylinder, and a top face of the bottom plate and disposed radially from the outer peripheral face of the inner cylinder in a range of an outside diameter of the tower shell or less; and a ring diaphragm coupling the lower end of the tower shell, the outer peripheral face of the inner cylinder, and the tower-side brackets. A tower coupling space is formed in center portion of the foundation, the tower coupling space comprises: a foundation space to which the foundation coupling part is inserted, and a foundation-side bracket disposed on an extension line of the tower-side bracket so as to be coupled and fixed to the tower-side bracket, and exposed to the foundation space is formed. The foundation coupling part is inserted in the tower coupling space, and between the coupling members on the foundation coupling part side and the foundation-side brackets are coupled via a splice plate or welding. Consequently, there is no member like the base plate larger than the outside diameter of the tower shell. Therefore, the outside diameter of the tower shell can be increased to the constraint condition, and the section efficiency can be improved. That is, as the maximum outside diameter of the tower, the outside diameter of the tower shell can be used.

In the monopole tower, preferably, the foundation-side bracket has an I shape in cross section provided with flanges at its top and bottom and, between a vertical walls of the tower-side bracket and the foundation-side bracket, the ring diaphragm and the flange, and the bottom plate and the flange are coupled via the splice plate and the bolts and nuts. With the configuration, the coupling strength between the tower and the foundation can be further improved.

In the invention, preferably, the diaphragm positioned vicinity of the lower end of the tower is positioned vicinity of the lower side of a door opening provided for the tower shell. With the configuration, the diaphragm can also serve as the floor provided for the entrance to the inside of the tower.

In the invention, preferably, the inner cylinder has a circular truncated cone shape whose upper end on the large diameter side is coupled to the tower shell. With the configuration, stress transfer from the tower shell toward the inner cylinder becomes smooth and, therefore, stress transfer from the tower to the foundation becomes also smooth.

In the invention, preferably, after coupling coupling members on the foundation coupling part side and the foundation-side brackets, the tower coupling space is filled with concrete.

A wind turbine generator as still another aspect of the invention has the monopole tower according to any of the aspects of the invention.

Since such a wind turbine generator has the monopole tower, the outside diameter of the tower shell can be used as the maximum outside diameter of the tower.

In the monopole tower and the wind turbine generator of the invention, the outside diameter of the tower shell can be used as the maximum diameter of the tower. In other words, a member projecting to the outside of the tower shell like the base plate becomes unnecessary. Thus, the outside diameter of the tower shell is maximized, and the section efficiency is improved. In addition, the tower supporting structure having the outside diameter as large as possible in the range of the constraints such as transport limitation. That is, by employing the tower supporting structure of the present invention, the wind turbine generator having the monopole tower can use the outside diameter of the tower shell as the maximum diameter.

As a result, for the tower which becomes more expensive and, moreover, in which the loading condition becomes stricter as the size of the wind turbine generator increases, the wind turbine generator having the tower supporting structure facilitating realization of both satisfaction of the constraint condition such as transport limitation and assurance of necessary strength is obtained.

Further, an inexpensive roll steel plate can be used for the brackets, the splice plates, and the like and, in addition, the expensive base flange and the anchor bolts become unnecessary, so that the cost of the wind turbine generator can be reduced. Further, the anchor bolts are not used, so that maintenance such as refastening is also unnecessary.

BRIEF DESCRIPTION OF DRAWINGS

FIG. 1C Cross section of a main part showing a state before coupling, of the tower and the foundation illustrated in FIG. 1A.

EXPLANATION OF REFERENCE

Figure 1A:
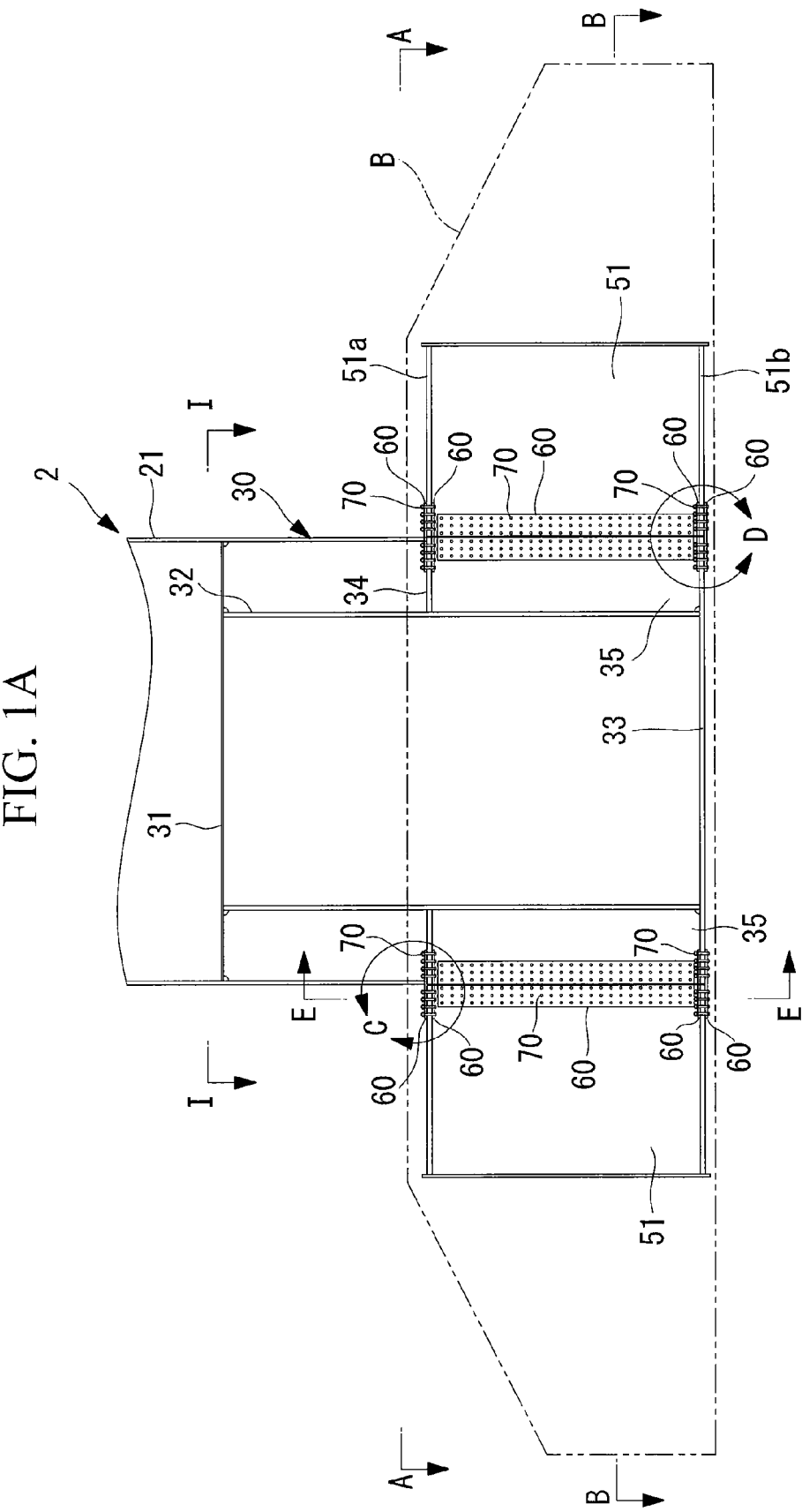
FIG. 1A Cross section of a main part showing a coupling structure between a tower and a foundation as a first embodiment of a wind turbine generator according to the present invention.
Figure 1B:
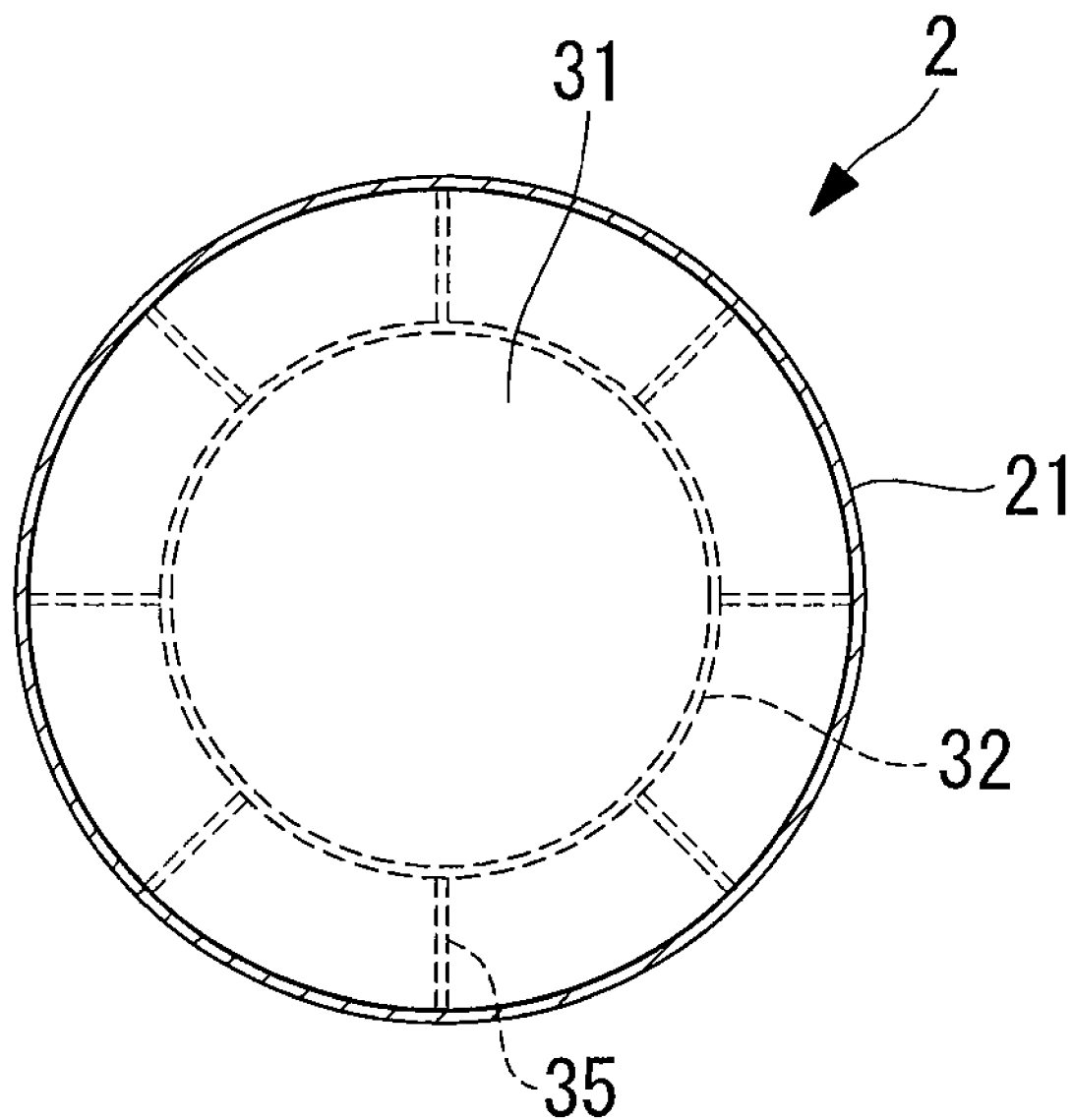
FIG. 1B Sectional bottom view taken along lien I-I of the tower shown in FIG. 1A.

1: wind turbine generator
2: tower for wind turbine
3: nacelle
4: rotor head
5: wind turbine blade
6: door opening
10: anchor bolt
11: nut
12: mortar
21: tower shell
22: base plate 23: through hole
30, 30A, 30B: foundation coupling parts
31: diaphragm
32, 32A: inner cylinders
33: bottom plate
34: ring diaphragm
35, 35A: tower-side brackets
50: tower coupling space
51: foundation-side bracket
51a: upper flange of foundation-side bracket
51b: lower flange of foundation-side bracket
52: foundation space
60: splice plate
70: bolt and nut
B: foundation

DETAILED DESCRIPTION OF THE INVENTION

Figure 6:
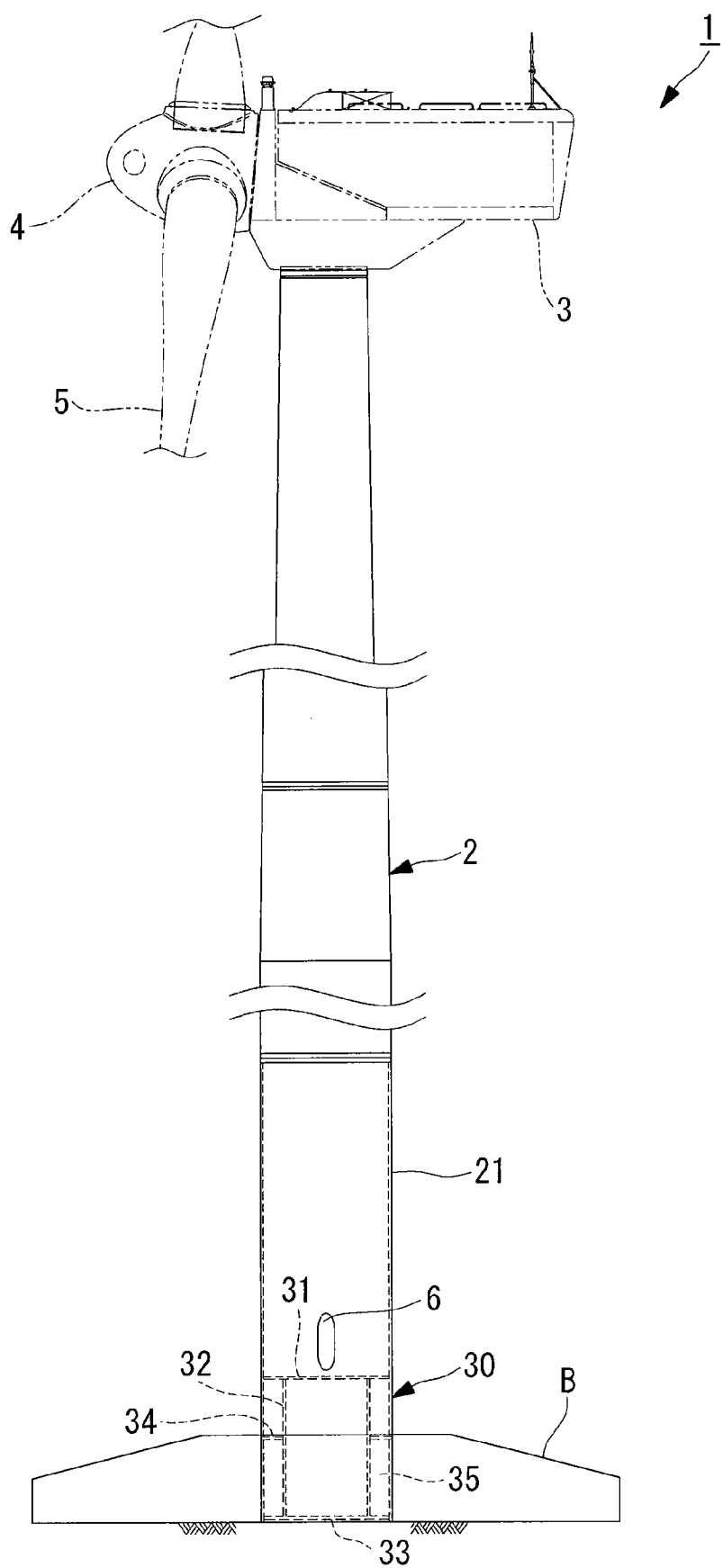
FIG. 6 Side view showing outline of a wind turbine generator having a tower structure of the present invention.

An embodiment of a tower supporting structure of a wind turbine generator according to the present invention will be described below with reference to the drawings. A wind turbine generator 1 of an upwind type shown in FIG. 6 has a tower 2 for a wind turbine (hereinbelow, called "tower") provided upright on a foundation B, a nacelle 3 mounted on the upper end of the tower 2, and a rotor head 4 supported so as to be rotatable about the rotary axis in an substantially horizontal direction and provided at one end of the nacelle 3.

To the rotor head 4, a plurality of (for example, three) wind turbine blades 5 are attached radially about the rotary axis of the rotor head 4. With the configuration, the force of wind hit by the wind turbine blades 5 from the rotary axis direction of the rotor head 4 is converted to power that rotates the rotor head 4 about the rotary axis direction.

In proper places in the outer peripheral surface (for example, an upper part) of the nacelle 3, an anemometer that measures a wind speed value of the periphery, an anemoscope that measures wind direction, and the like are mounted.

Specifically, the wind turbine generator 1 generates power by driving a power generator (not shown) with the rotor head 4 receiving wind force by its wind turbine blades 5 and rotating about the rotary axis which is substantially horizontal direction is mounted in the nacelle 3. The nacelle 3 is mounted on the upper end of the tower 2 which is provided upright on the foundation B made of reinforced concrete and supported so as to yaw. In this case, the tower 2 is of the monopole type made of steel. By connecting flanges (not shown) provided at ends of a plurality of tower sections obtained by dividing the tower 2 in the height direction, a cylindrical tower assuring necessary length (height) is obtained.

First Embodiment

A tower supporting structure for supporting the tower 2 upright on the foundation B will be described below with reference to FIGS. 1A to 6.

In the tower supporting structure shown in the diagram, a foundation coupling part 30 is formed on the lower end side of the tower 2. The foundation coupling part 30 is inserted in a tower coupling space 50 which is not yet filled with concrete and is preliminarily formed in the center of the foundation B to support the tower 2 upright.

In the foundation coupling part 30 inserted in the tower coupling space 50, a coupling member on the side of the foundation coupling part 30 which will be described later and a foundation-side bracket 51 provided as a coupling member in the tower coupling space 50 are coupled to each other via a splice plate 60 and bolts and nuts 70. After that, the space in the tower coupling space 50 is filled with concrete, and the concrete is solidified, thereby completing mounting of the tower 2.

The above-described foundation coupling part 30 has: a diaphragm 31 mounted in the position vicinity of the lower end on the inside of the tower 2; an inner cylinder 32 coupled to the under face of the diaphragm 31 and extending downward in a tower shell 21 to the inside of the foundation B; a bottom plate 33 attached to the lower end of the inner cylinder 32 and having the diameter same as the outside diameter of the tower shell 21; a ring diaphragm 34 coupling the lower end of the tower shell 21 and the outer peripheral face of the inner cylinder 32; and a plurality of tower-side brackets 35 coupled to the under face of the diaphragm 31, the inner face of the tower shell 21, the outer face of the inner cylinder 32, divided faces in the circumferential direction of the ring diaphragm 34 and the top face of the bottom plate 33 and disposed radially from the outer peripheral face of the inner cylinder 32.

The diaphragm 31 is a circular plate member having the diameter same as the inside diameter of the tower 2. The diaphragm 31 is attached by being welded to the inside wall of the tower shell 21 so as to vertically divide the internal space of the tower 2.

The diaphragm 31 is attached in a position vicinity of the lower end of the tower 2 slightly lower than a door opening 6 provided for the tower shell 21, that is, vicinity of the lower side of the door opening 6 provided for the tower shell 21, and is also used as an inner floor material of the tower 2.

The door opening 6 is provided so that a worker enters the tower 2 at the time of construction, maintenance, and the like, and is provided with an openable door.

The inner cylinder 32 is a concentric cylindrical member disposed in the internal space of the tower shell 21, and the upper end of the cylinder is welded to the under face of the diaphragm 31. The lower end of the cylinder 32 is lower than the lower end of the tower shell 21 and enters the foundation B in a predetermined mounting position.

The bottom plate 33 is a plate member having a circular or polygonal shape welded to the lower end of the inner cylinder 32. The bottom plate 33 has a diameter substantially the same as the outside diameter of the tower shell 21. After concrete is filled and solidified, the bottom plate 33 is supported on a concrete mounting face formed in the tower coupling space 50. The bottom plate 33 is also used as a coupling member on the foundation coupling part 30 side.

The ring diaphragm 34 is an annular plate member coupling the lower end of the tower shell 21, the outer peripheral surface of the inner cylinder 32, and the side face of the tower-side brackets 35. The ring diaphragm 34 is divided in the circumferential direction in the position of the tower-side brackets 35, that is, in a circular arc shape. The inner peripheral end is welded to the outer peripheral surface of the inner cylinder 32, the outer peripheral end is welded to the lower end of the tower shell 21, and a divided face in the circumferential direction is welded to the side face of the tower-side bracket 35.

The tower-side bracket 35 is a rectangular plate member welded to the outer surface of the inner cylinder 32, the inner face of the tower shell 21, the bottom face of the diaphragm 31, and the top face of the bottom plate 33. A plurality of tower-side brackets 35 are disposed radially from the outer peripheral surface of the inner cylinder 32 to the outside diameter of the tower shell 21. In a configuration example shown in the diagram, eight tower-side brackets 35 are attached radially at pitches of 45 degrees in the circumferential direction from the outer peripheral surface of the inner cylinder 32. The tower-side bracket 35 is a member used as a main coupling member on the foundation coupling part 30 side.

The number of tower-side brackets 35 can be changed properly according to conditions and, therefore, is not limited to eight.

Figure 5:
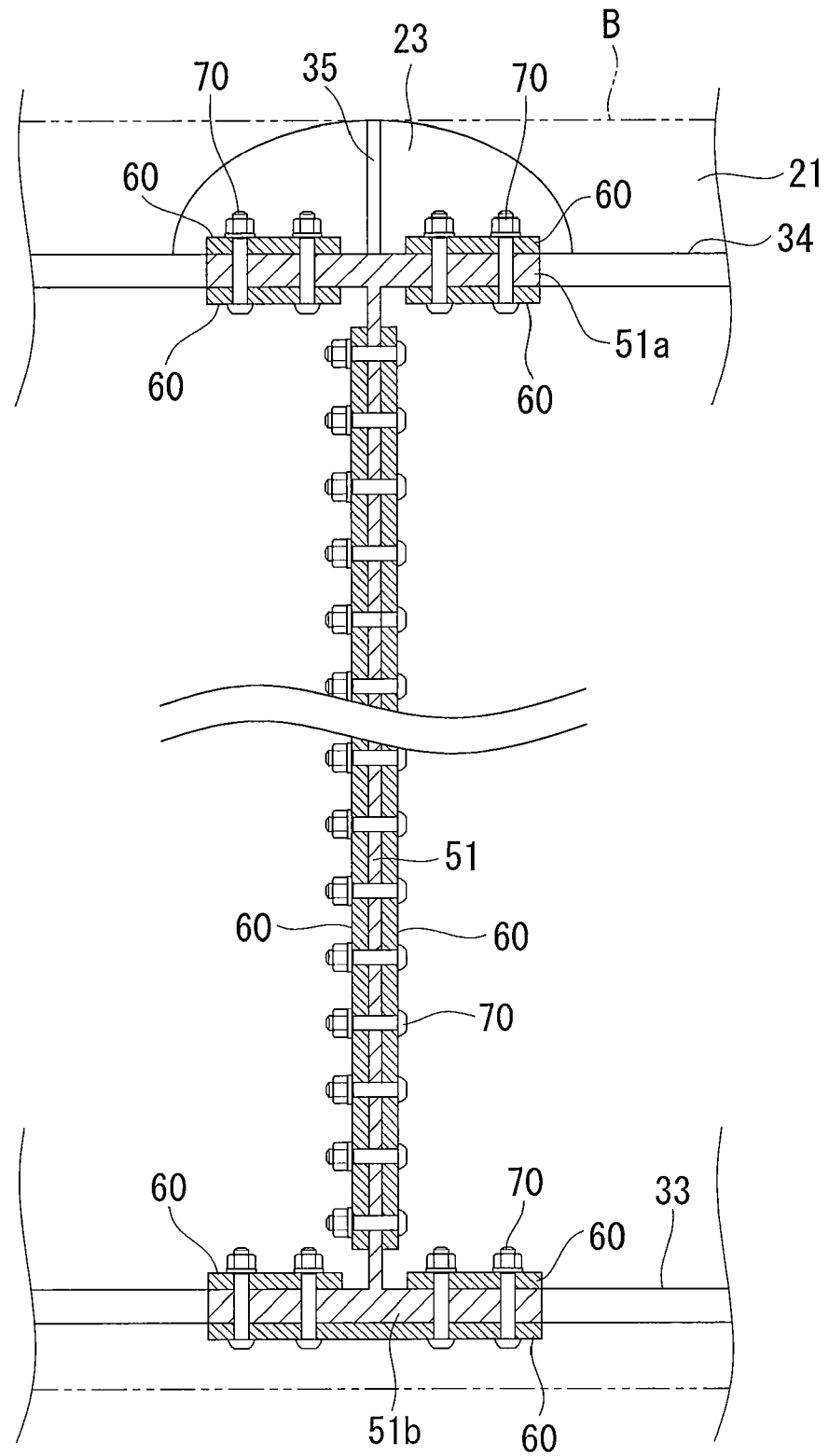
FIG. 5 Diagram taken along line E-E of FIGS. 1A and 2.

The tower coupling space 50 is formed in a center portion in the foundation B. The tower coupling space 50 when concrete is not filled is a foundation space 52. The foundation-side brackets 51 integrated with the foundation B are exposed to the foundation space 52. As the foundation-side bracket 51, for example, as shown in FIG. 5, a member having an I shape in cross section provided with flanges 51a and 51b at its top and bottom is employed.

The foundation-side bracket 51 in this case is disposed on the extension line of the tower-side bracket 35 so as to be connected to the tower-side bracket 35. Specifically, the foundation-side brackets 51 are radially attached at pitches of 45 degrees in the circumferential direction so as to be connected to the eight tower-side brackets 35 disposed radially in predetermined tower mounting positions. As a result, in the predetermined tower mounting positions, the tower-side brackets 35 and the foundation-side brackets 51 exist on the same straight lines disposed radially.

At the time of mounting the tower 2 in the foundation B and fixing it, the foundation coupling part 30 is inserted in the tower coupling space 50, and the tower-side bracket 35 as a coupling member on the side of the foundation coupling part 30, the bottom plate 33, the ring diaphragm 34, and the foundation-side bracket 51 are coupled by using splice plates 60 and bolts and nuts 70.

The splice plate 60 is a plate member disposed over the coupling member on the side of the foundation coupling part 30 and the coupling member on the side of the tower coupling space 50. The splice plates 60 are disposed on both sides so as to sandwich the coupling members from both faces. By fastening the three members with a number of bolts and nuts 70 penetrating the coupling members and the splice plates 60 disposed on both faces, the coupling members of the foundation coupling part 30 and the tower coupling space 50 are coupled to each other firmly.

For coupling of the tower-side bracket 35 as a coupling member on the foundation coupling part 30 side, the bottom plate 33, the ring diaphragm 34, and the foundation-side bracket 51, a configuration of friction joint using high-strength bolts and nuts as the bolts and nuts in the above-described manner, a configuration using rivets, or a configuration of welding without using the splice plates and bolts and nuts can be properly selected.

Figure 4A:
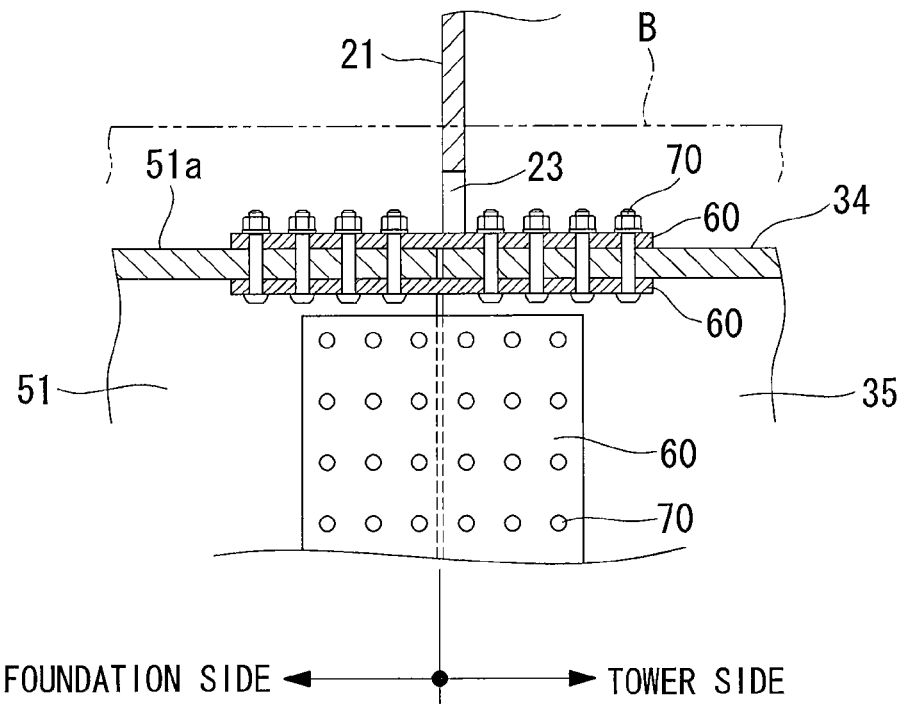
FIG. 4A Enlarged view of a portion C in FIG. 1A.

FIG. 4A is an enlarged diagram of the portion C in FIG. 1A. The flange 51a provided on the foundation-side bracket 51 and the tower-side ring diaphragm 34 are sandwiched by two upper and lower splice plates 60, and the three plate members are fastened by a number of bolts and nuts 70. To make the splice plates 60 penetrate the tower 2, through holes 23 are formed in the tower shell 21.

Figure 4B:
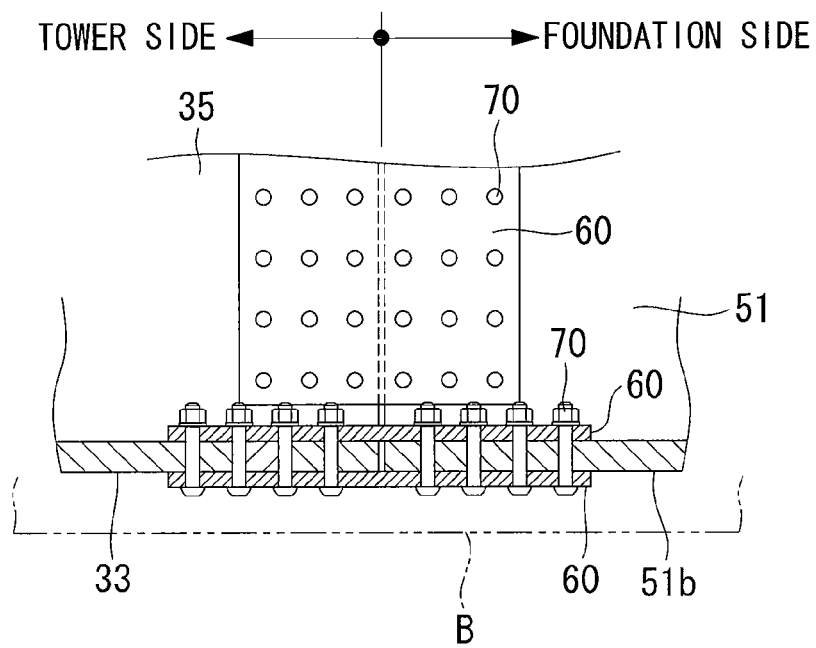
FIG. 4B Enlarged view of a portion D in FIG. 1A.

FIG. 4B is an enlarged diagram of the portion D in FIG. 1A. The flange 51b provided below the foundation-side bracket 51 and the tower-side bottom plate 33 are sandwiched by two upper and lower splice plates 60, and the three plate members are fastened by a number of bolts and nuts 70.

Figure 2:
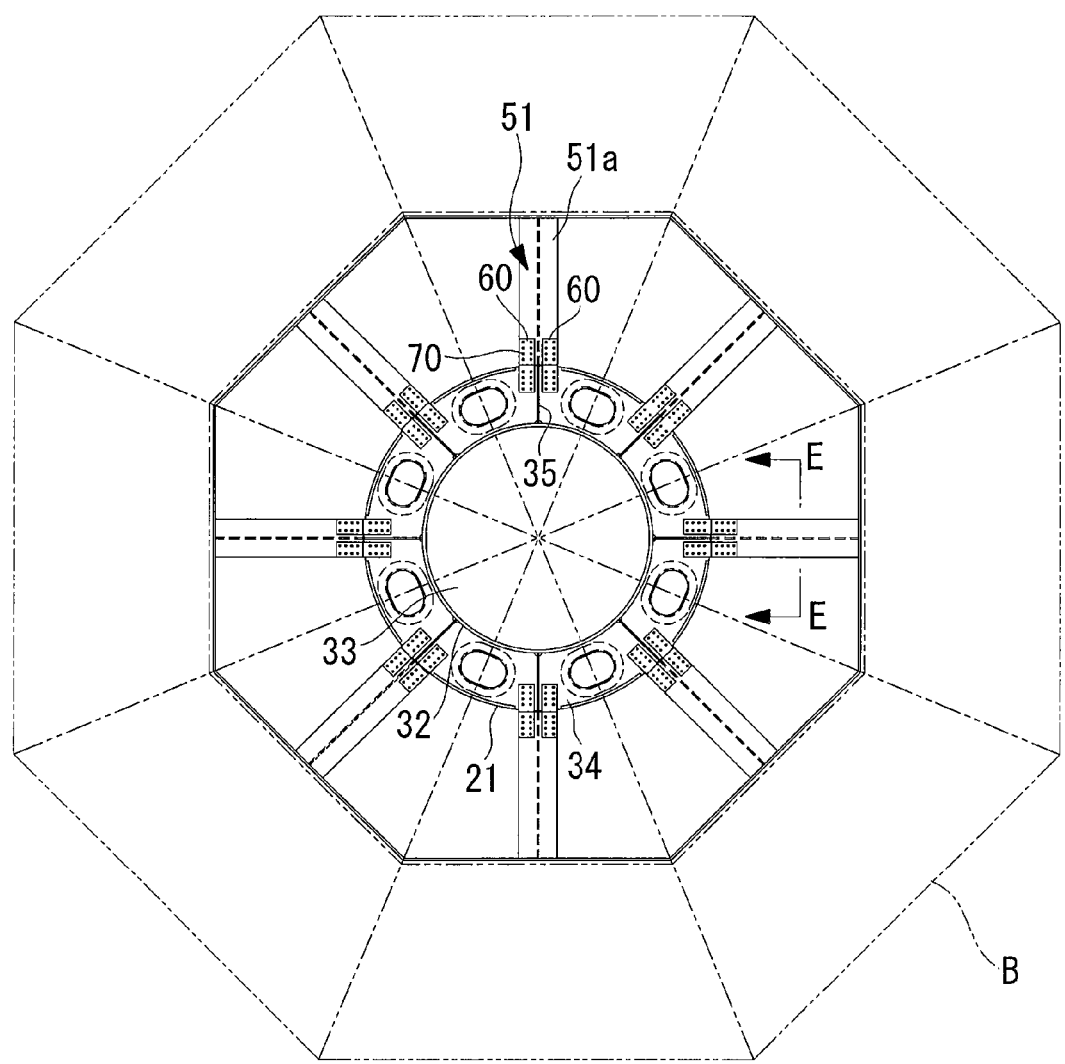
FIG. 2 Cross section taken along line A-A of FIG. 1A.
Figure 3:
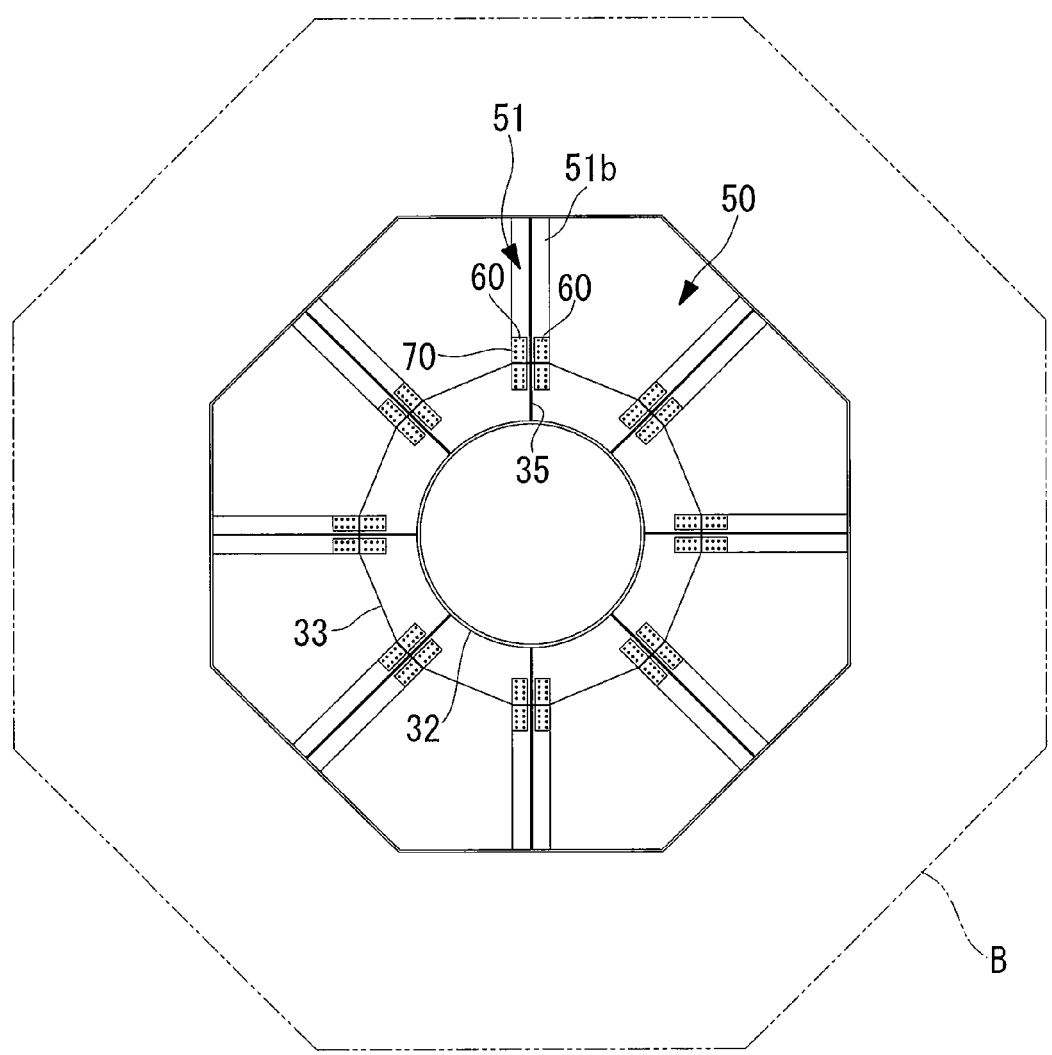
FIG. 3 Cross section taken along line B-B of FIG. 1A.

FIG. 5 is a cross section taken along line E-E of FIG. 2. The upper and lower flanges 51a and 51b provided for the foundation-side bracket 51 having the I shape in section are coupled to the ring diaphragm 34 and the bottom plate 33, respectively, by the splice plates 60 and the bolts and nuts 70 on both sides coupling the vertical walls. In this case, the coupling part between the vertical walls is a part where the tower-side bracket 35 and the foundation-side bracket 51 disposed in the vertical direction are coupled with the splice plates 60 and the bolts and nuts 70.

As described above, with the I-shape section obtained by providing the foundation-side bracket 51 with the upper and lower flanges 51a and 51b, in addition to the vertical walls of the tower-side bracket 35 and the foundation-side bracket 51, the ring diaphragm 34, the bottom plate 33, and the flanges 51a and 51b can be coupled by the splice plates 60 and the bolts and nuts 70. As a result, the foundation coupling part 30 and the foundation B are coupled firmly in both of the vertical and horizontal directions, so that the coupling strength between the tower 2 and the foundation B can be further improved.

After coupling the coupling member on the foundation coupling part 30 side and the foundation-side bracket 51 of the tower coupling space 50 as described above, the tower coupling space 50 is filled with concrete. When the concrete in the tower coupling space 50 is solidified, a tower supporting structure that makes the tower 2 stand upright on the foundation B is completed. In the case of making the tower 2 stand upright on the foundation B, it is sufficient to provide the lowest tower section provided with the foundation coupling part 30 upright on the foundation B, sequentially couple upper tower sections, and complete the monopole tower 2 having necessary height.

The tower supporting structure constructed as described above does not need the base plate 22 having the largest outside diameter in the conventional structure, so that there is no member larger than the outside diameter of the tower shell 21. Therefore, the tower 2 can be designed so that the outside diameter of the tower shell 21 satisfies constraints such as transport limitation. The outside diameter of the tower shell 21 can be increased to the constraint condition, and the section efficiency can be improved. That is, as the maximum outside diameter of the tower 2, the outside diameter of the tower shell 21 can be used. To improve welding workability, it may be also considered to make the outside diameter of the ring diaphragm 34 slightly larger than that of the tower shell 21.

The lower end of the tower 2 has a double-pipe structure made by the tower shell 21 and the inner cylinder 32 in a region lower than the diaphragm 31. Consequently, strength of the lower end side as the root of the tower 2 increases, and the thickness of the tower shell 21 can be reduced by the double structure.

Further, by setting the diaphragm 31 vicinity of the lower side of the door opening 6, the diaphragm 31 can be also used as the inner floor member of the tower 2.

Figure 7:
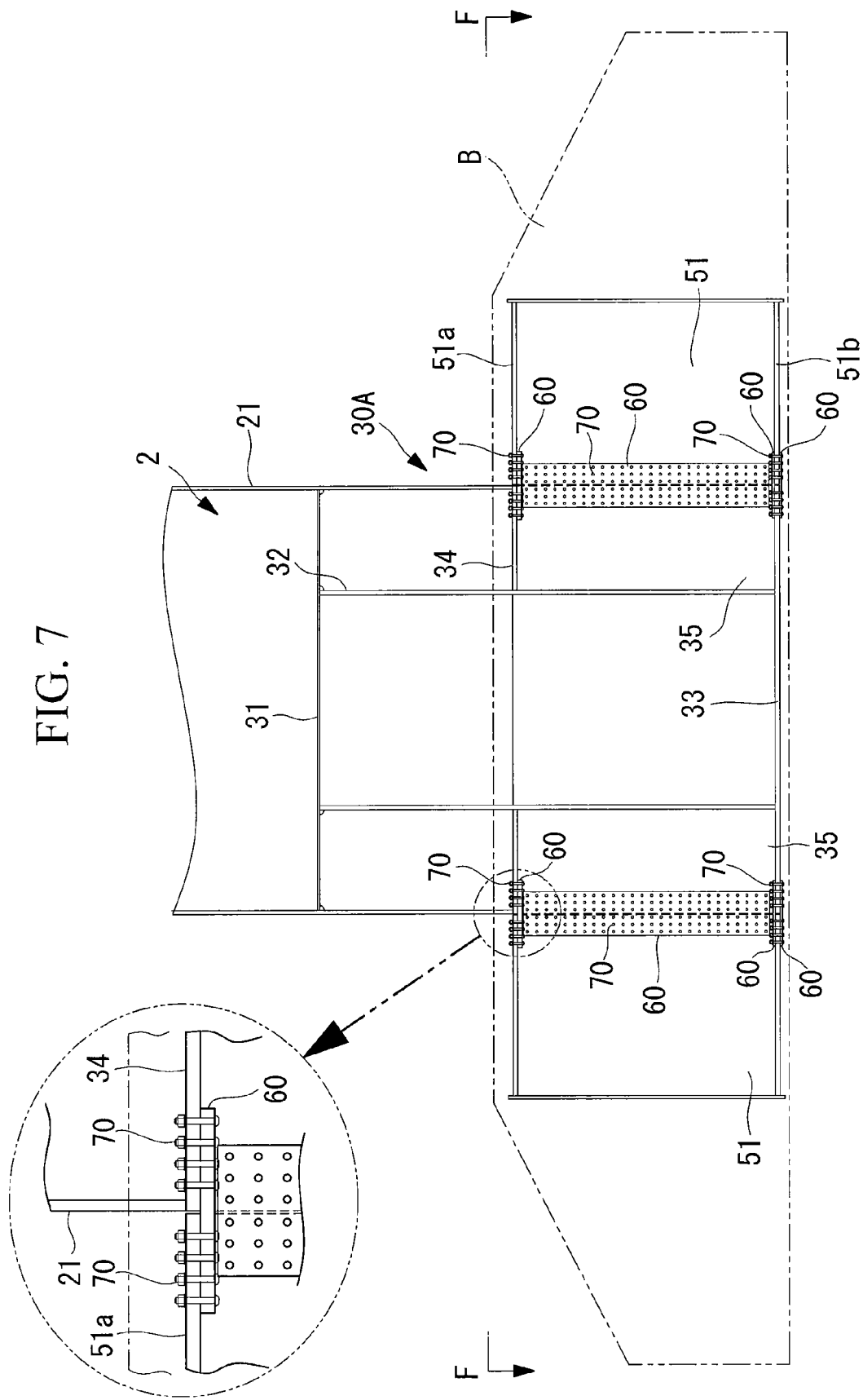
FIG. 7 Cross section of a main part showing a modification of the coupling structure of the wind turbine generator illustrated in FIG. 1A.
Figure 8:
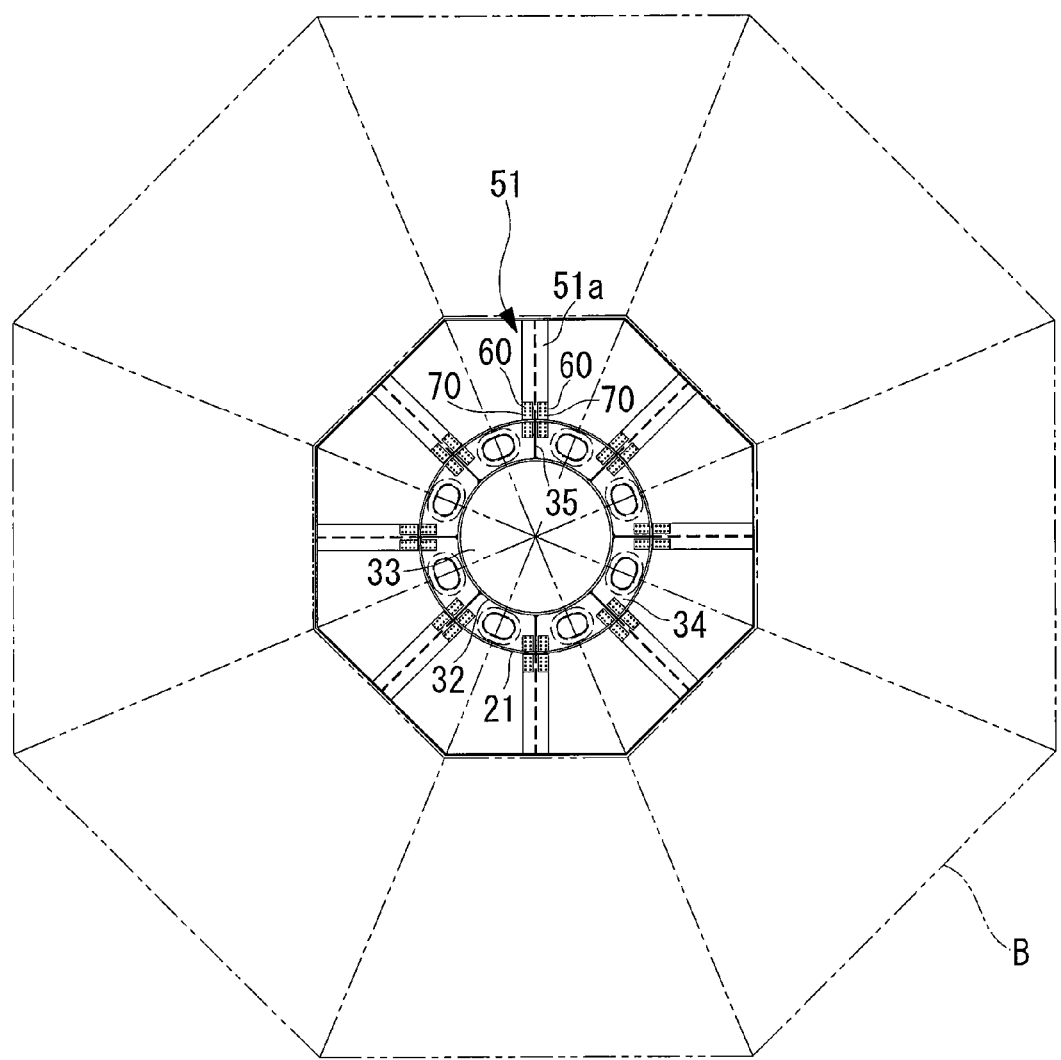
FIG. 8 Cross section taken along line F-F of FIG. 7.

In the foregoing embodiment, by providing the through holes 23 in the tower shell 21, the ring diaphragm 34 and the flange 51a are coupled by the slice plates 60 penetrating the tower shell 21. For example, like a modification as shown in FIGS. 7 and 8, a structure of coupling the ring diaphragm 34 and the flange 51a only by a lower splice plate without providing the through holes 23 may be also employed.

The tower supporting structure having such a foundation coupling part 30A makes the coupling strength of the flange 51a slightly weaker. However, there is also an advantage such that man hour and material cost required for the work can be reduced. The structure can be therefore properly selected according to the height of the tower 2, loading conditions of the nacelle 3, and the like.

Second Embodiment

Figure 9:
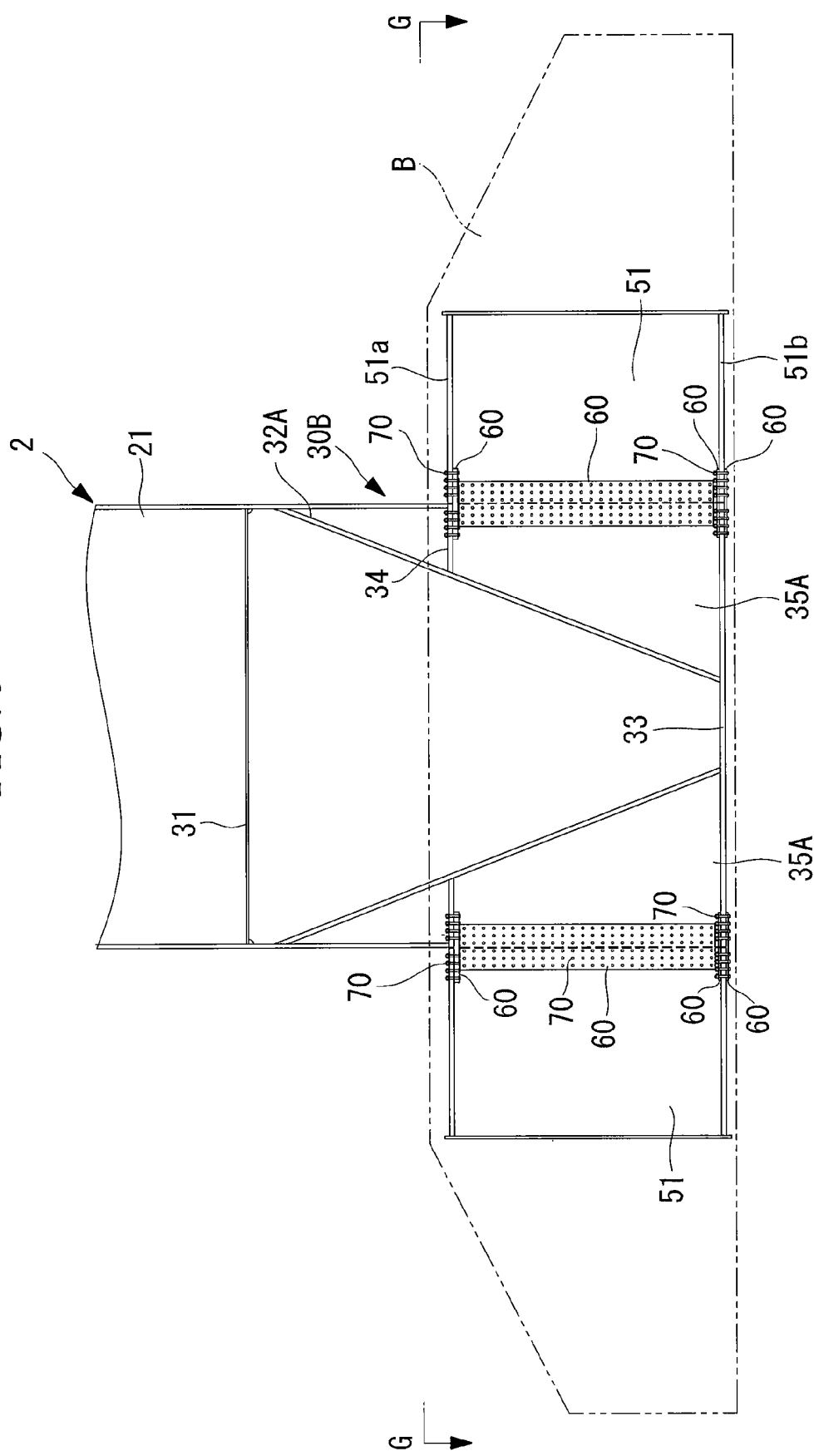
FIG. 9 Cross section of a main part showing the coupling structure of a tower and a foundation as a second embodiment of the wind turbine generator according to the invention.
Figure 10:
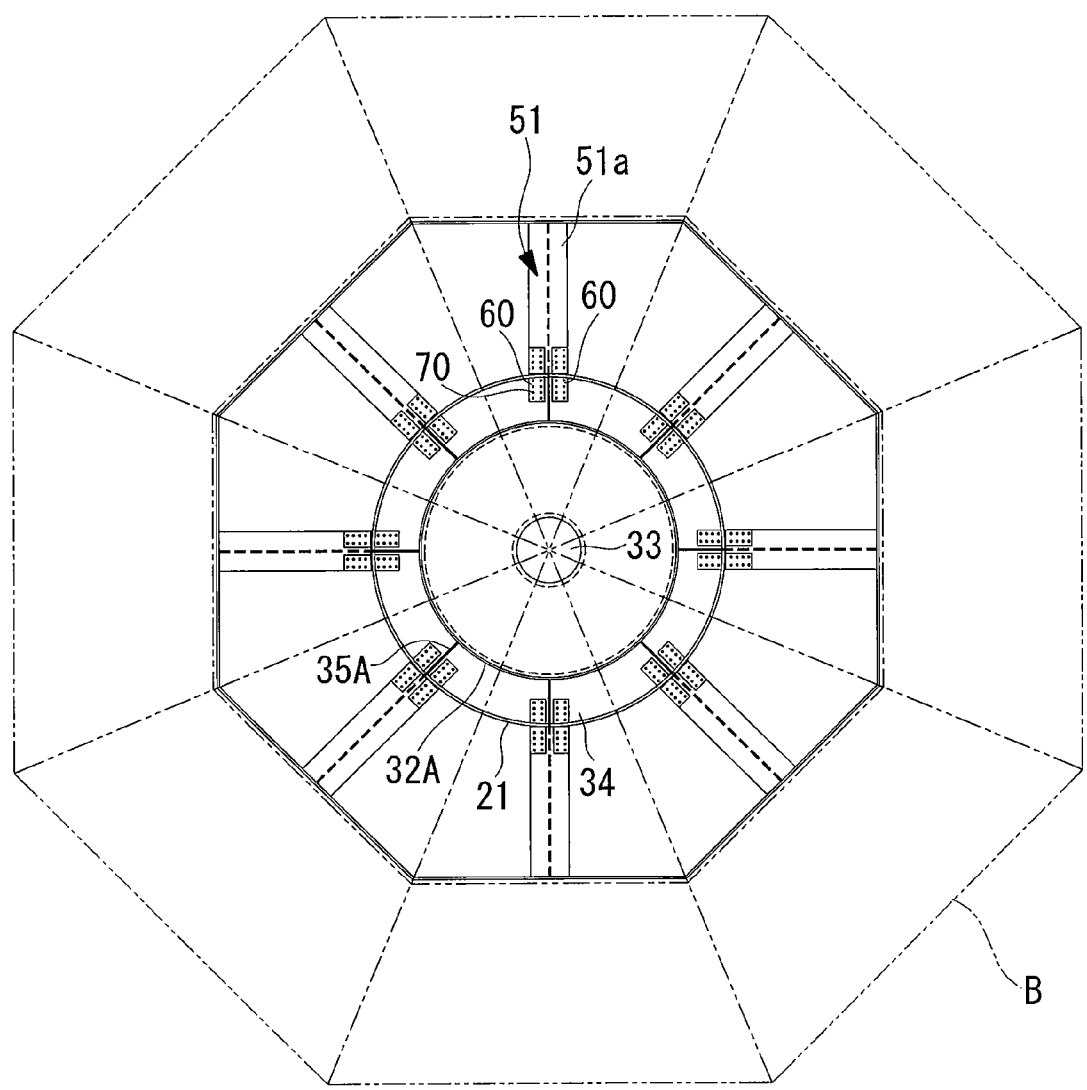
FIG. 10 Cross section taken along line G-G of FIG. 9.
Figure 11:
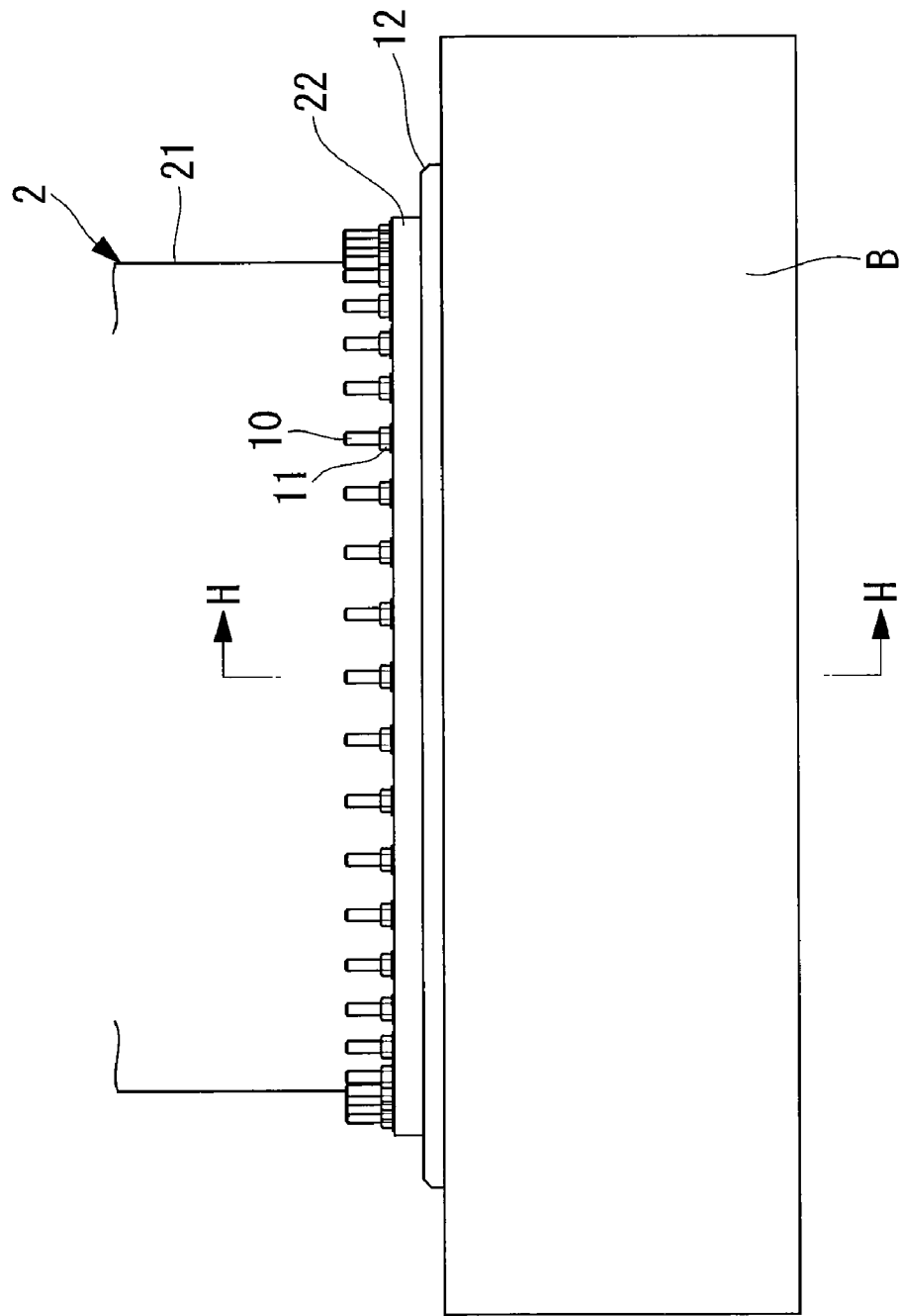
FIG. 11 Appearance view of a main part of a conventional structure example of a coupling part between a tower and a foundation in a wind turbine generator.
Figure 12:
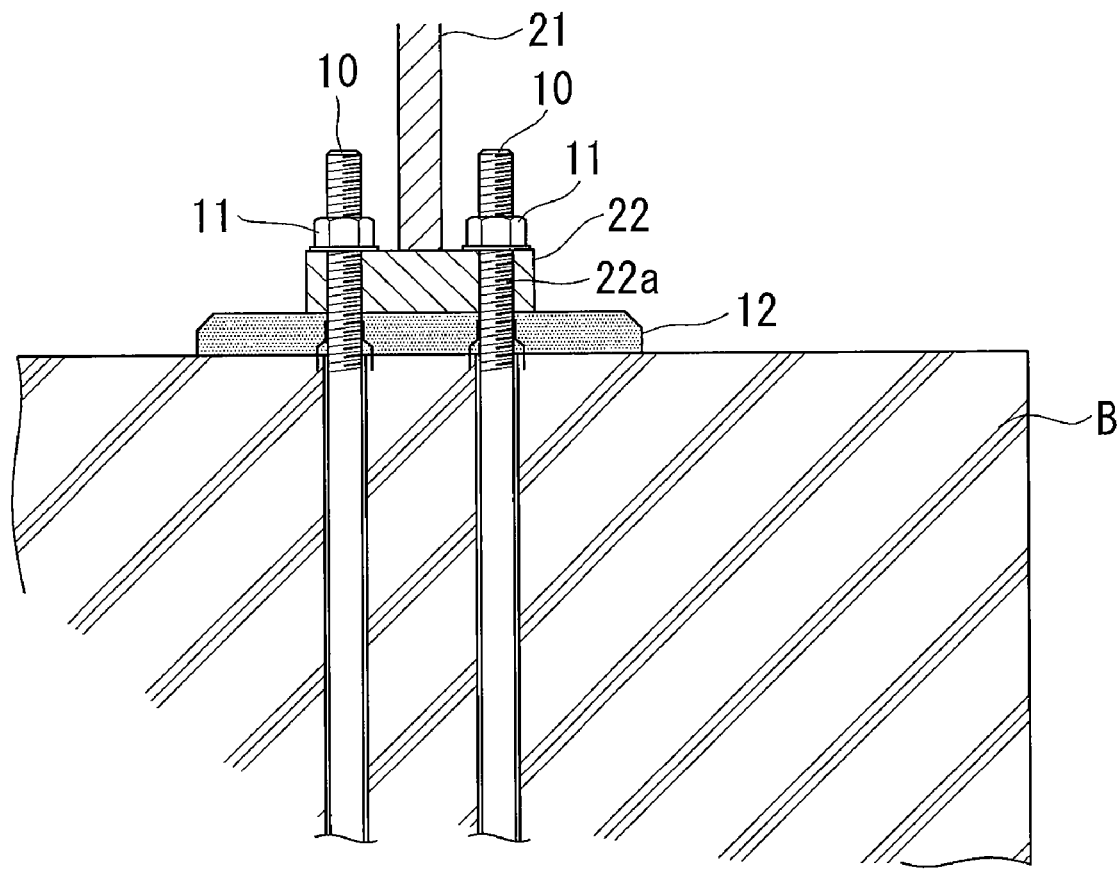
FIG. 12 Enlarged cross section taken along line H-H of FIG. 11.

A second embodiment of the tower supporting structure in which the tower 2 is provided upright on the foundation B will now be described with reference to FIGS. 9 and 10. The same reference numerals are designated to parts similar to those of the foregoing embodiment and their detailed description will not be repeated.

The second embodiment relates to a foundation coupling part 30B employing an inner cylinder 32A having a circular truncated cone shape whose upper end on the larger diameter side is coupled to the tower shell 21. That is, the inner cylinder 32A of the embodiment has a structure that the upper end having a large diameter is directly welded to the inner wall of the tower shell 21, and the lower end having a small diameter is welded to the bottom plate 33.

Consequently, stress transfer from the tower shell 21 to the inner cylinder 32A is direct and smooth different from that in the cylinder shape in which stress is transferred via the diaphragm 31. Therefore, stress transfer from the tower 2 to the foundation B becomes also smooth.

According to the foregoing embodiments of the invention, for the lower end side of the tower 2, the foundation coupling part 30, 30A, or 30B of the double-pipe structure made by the tower shell 21 and the cylindrical shaped inner cylinder 32 (or the inner cylinder 32A) which are concentric is provided.

In the double-pipe structure, by extending the inner cylinder 32 or 32A toward the inside of the foundation B, the inner cylinder 32 or 32A becomes long downward from the tower shell 21. At the time of providing the tower 2 upright on the foundation B, the extended part of the inner cylinder 32, 32A and the tower-side coupling members (the tower-side bracket 35, the ring diaphragm 34, and the bottom plate 33) provided in the range of the outside diameter of the tower shell 21 or less are inserted in the tower coupling space 50 which is preliminarily provided in the foundation B and is not filled with concrete yet.

The tower coupling space 50 is a space provided in a center portion to insert and mount the lower end of the tower 2 in the foundation B made of reinforced concrete. That is, in the foundation B in this case, reinforcing rods are driven in the periphery of the tower coupling space 50, and concrete filled between the reinforcing rods is solidified.

The tower coupling space 50 is provided with the foundation-side brackets (foundation-side coupling member) 51 integrated with the foundation B and held by the concrete. The foundation-side bracket 51 is, for example, a steel plate member having an substantially I shape in section and provided with the flanges 51a and 51b at the upper and lower ends.

After the extension part of the inner cylinder 32, 32A and the tower-side coupling members (the tower-side bracket 35, the ring diaphragm 34, and the base plate 33) are inserted in the tower coupling space 50, the foundation-side bracket 51 and the tower-side coupling members are coupled with the splice plates 60 and the bolts and nuts 70. After that, the tower coupling space 50 in the space which is not filled with concrete is filled with concrete and the concrete is solidified, thereby completing providing of the tower 2 upright on the foundation B.

Therefore, there is no member like the base plate 22 larger than the outside diameter of the tower shell 21. The outside diameter of the tower shell 21 can be increased to the constraint condition, and the section efficiency can be improved. That is, as the maximum outside diameter of the tower 2, the outside diameter of the tower shell 21 can be used.

In the wind turbine generator of the foregoing embodiments, the outside diameter of the tower shell 21 can be used as the maximum diameter of the tower 2. Therefore, the outside diameter of the tower shell 21 can be increased to the maximum and the section efficiency is improved. In addition, the tower supporting structure whose outside diameter is increased as much as possible within the range in which the weight can be reduced is realized. That is, in the wind turbine generator 1 having the monopole tower 2, by employing the tower supporting structure of the foregoing embodiments, the outside dimension of the tower shell 21 can be maximized.

As a result, it becomes easier for the tower 2 which becomes more expensive and, moreover, in which the loading condition becomes stricter as the size of the wind turbine generator 1 increases to realize both satisfaction of the constraint condition such as transport limitation and assurance of necessary strength. Moreover, the wind turbine generator having the tower supporting structure realizing reduced thickness of the tower 2 and reduced weight is obtained.

Further, an inexpensive roll steel plate can be used for the brackets 35 and 51, the splice plates 60, and the like and, in addition, the expensive base plate 22, the anchor bolts 10, and nuts 11 become unnecessary, so that the cost of the wind turbine generator 1 can be reduced.

Further, the anchor bolts 10 are not used, so that maintenance such as refastening is also unnecessary.

When the outside diameter of the tower shell 21 increases, the flange diameter in a coupling which couples the tower sections also increases. Thus, the size and quantity of bolts that couple the flange can be reduced.

The present invention is not limited to the foregoing embodiments but can be properly changed without departing from the gist. The invention can be applied to, for example, both of the up-wind type and the down-wind type.

The invention claimed is:

1. A wind turbine generator comprising a monopole tower provided upright on a foundation,
    wherein a lower end of the tower includes:
    an inner cylinder extending downwardly into the foundation, and disposed radially within and concentric with a tower shell of the monopole tower; and
    foundation coupling parts including a plurality of plate-like tower-side coupling members extending radially from an outer peripheral surface of the inner cylinder to end within an outside diameter of the tower shell,
    wherein the foundation coupling parts form a double-pipe structure integral with the tower shell, with the inner cylinder having a smaller diameter with respect to the tower shell and being coaxially disposed within the tower shell,
    wherein the foundation coupling parts are inserted in a space within the foundation having foundation-side coupling members provided for a center portion of the foundation,
    wherein the foundation-side coupling members are fixed to the foundation and connected to the tower-side coupling members, and
    wherein the foundation-side coupling members and the tower-side coupling members are coupled to each other by welding, a bolt using a splice plate, or a rivet.

2. The wind turbine generator according to claim 1, wherein the tower coupling space is filled with concrete.

3. A wind turbine generator comprising a monopole tower provided upright on a foundation made of reinforced concrete,
    wherein a foundation coupling part disposed on a lower end side of the tower comprises:
    a diaphragm which is a circular plate member having a diameter that is the same as an inside diameter of the tower, and is mounted so as to vertically divide an internal space of the tower;

an inner cylinder which is coupled to an under face of the diaphragm, extends downward into the foundation, and is disposed radially within and concentric with a tower shell of the monopole tower;

a bottom plate which has a circular or polygonal shape and is attached to the lower end of the inner cylinder and having a diameter substantially the same as an outside diameter of the tower shell;

a plurality of plate-like tower-side brackets each of which extends radially from an outer face of the inner cylinder to end within an outside diameter of the tower shell, the under face of the diaphragm, and a top face of the bottom plate; and a ring diaphragm coupling the lower end of the tower shell, the outer face of the inner cylinder, and the plurality of tower-side brackets, wherein the foundation coupling part forms a double-pipe structure integral with the tower shell, with the inner cylinder having a smaller diameter with respect to the tower shell and being coaxially disposed within the tower shell, wherein a tower coupling space disposed in the foundation comprises:

a foundation space to which the foundation coupling part is inserted; and a foundation-side bracket exposed to the foundation space, and lined up with and coupled to the tower-side bracket of the foundation coupling part via a splice plate or welding.

4. The wind turbine generator according to claim 3, wherein the tower coupling space is filled with concrete.

5. The wind turbine generator according to claim 3, wherein the foundation-side bracket has an I shape in cross section provided with flanges at its top and bottom, and vertical walls of the tower-side brackets and the foundation-side bracket, the ring diaphragm and the flange, and the bottom plate and the flange are coupled via the splice plate or by welding.

6. The wind turbine generator according to claim 3, wherein the lower end side of the tower includes a door opening in the tower shell.

7. The wind turbine generator according to claim 3, wherein the inner cylinder has a circular truncated cone shape whose upper end on the large diameter side is coupled to the tower shell.

* * * * *